United States Patent
Lafita Sánchez

(10) Patent No.: US 9,205,585 B2
(45) Date of Patent: Dec. 8, 2015

(54) MOLD CENTERING SYSTEM

(75) Inventor: Xavier Lafita Sánchez, La Llagosta (ES)

(73) Assignee: BOLEXP NORMALIZADOS, S.L.U., La Llagosta (Barcelona) (ES)

( * ) Notice: Subject to any disclaimer, the term of this patent is extended or adjusted under 35 U.S.C. 154(b) by 684 days.

(21) Appl. No.: 13/563,780

(22) Filed: Aug. 1, 2012

(65) Prior Publication Data

US 2013/0034622 A1     Feb. 7, 2013

(30) Foreign Application Priority Data

Aug. 5, 2011   (ES) .................................. 201131366

(51) Int. Cl.
*B29C 45/26*   (2006.01)

(52) U.S. Cl.
CPC .................................. *B29C 45/2606* (2013.01)

(58) Field of Classification Search
CPC .................................................. B29C 45/2606
See application file for complete search history.

(56) References Cited

U.S. PATENT DOCUMENTS

| | | | | |
|---|---|---|---|---|
| 2,846,278 A * | 8/1958 | Blazek | ........................... | 384/30 |
| 4,750,876 A * | 6/1988 | Lawson | ........................ | 425/406 |
| 4,832,510 A | 5/1989 | Sato | | |
| 6,558,145 B2 * | 5/2003 | Wieder | ........................ | 425/107 |
| 6,953,331 B2 * | 10/2005 | Bokich | ..................... | 425/192 R |
| 7,828,542 B2 * | 11/2010 | Bokich | ........................ | 425/190 |
| 7,862,326 B2 * | 1/2011 | Wieder | ........................ | 425/472 |
| 8,821,144 B2 * | 9/2014 | Starkey et al. | ................ | 425/107 |
| 2002/0044983 A1 * | 4/2002 | Wieder | ........................ | 425/192 R |
| 2004/0043103 A1 | 3/2004 | Bokich | | |
| 2008/0286397 A1 * | 11/2008 | Wieder | ........................ | 425/161 |

FOREIGN PATENT DOCUMENTS

| | | |
|---|---|---|
| DE | 33 18 182 | 11/1984 |
| ES | 2 238 881 | 9/2005 |
| GB | 2 410 000 | 7/2005 |
| JP | 2001-30302 | 2/2001 |
| JP | 2008-2529 | 1/2008 |

OTHER PUBLICATIONS

Spanish Search Report issued Feb. 22, 2013 in Spanish Application No. 201131366 (with partial machine translation).

* cited by examiner

*Primary Examiner* — Ryan Ochylski
(74) *Attorney, Agent, or Firm* — Wenderoth, Lind & Ponack, L.L.P.

(57) ABSTRACT

It comprises several centering elements (1) arranged on the sides of a mold, wherein each one of them comprises a male device (3) screwed to a first portion (4) of the mold and a female device (6) screwed to a second portion (7) of the mold, being both portions (4-7) fastened to a fixed plate (8) and to a moveable plate (5) of an injection machine. It is characterised in that a through hole (11) of the female device (6) incorporates at least two parallel planes delimited by at least two groups of revolving bodies located in guiding housings, which have a closed contour, and through which the revolving bodies travel with an endless motion, in simultaneous combination with a spinning motion of said revolving bodies, while the elongated shafts (10) of the male device, move inside the through holes (11), said shafts contacting tangentially against some of the aforementioned revolving bodies.

13 Claims, 5 Drawing Sheets

MOLD CENTERING SYSTEM

OBJECT OF THE INVENTION

The present invention, as expressed in the wording of the specification, relates to a mold centering system intended to achieve, during the molds closing, a better adjustment between a first portion of the mold, which is fastened to a moveable plate and a second portion of the mold, which is fastened to a fixed plate of an injection machine, in such a way that during the closing of the mold its two portions come close together frontally until abutting against each other in a direction, due to the frontal motion of the moveable plate of the machine.

The mold centering system essentially comprises, at least two centering elements, wherein each one of them in turn comprises a male device and a female device, in which the male device fits, precisely during the final run of the mold closing travel, thus ensuring a correct alignment, guaranteeing a "zero point" positioning of the axis, which use to get distorted because of the expansions due to variations in the working temperature.

The adjustment between each male device and each female device is carried out by a characteristic surface of contact where a number of clusters of revolving bodies evolve with an endless travel. Said revolving bodies are coupled into guiding housings, which have a closed contour. The male device contacts said revolving bodies during the final run of the mold closing and also during the initial run of the opening thereof.

Thus, the characteristic centering system of the invention allows a better fit between the male device and the female device, reducing friction, consequently avoiding seizure problems, and at the same time facilitating the adjustment movements.

The recirculation of the revolving bodies with the endless travel allows the pairs of male devices and female devices to fit into each other, having a limitless adjustment in the intended length according to the mold closing direction.

BACKGROUND OF THE INVENTION

The traditional mold centering system comprises two portions, a male portion and a female portion, made in steel and having diverse material hardness, so a greater adjustment can be achieved with greater friction without any sliding problem whatsoever, in such a way that usually it is provided with graphite pads that act as a solid lubricant element, and even different coverings on the female portion to smooth the friction.

Mainly, there are two models, which differ in the way of attaching the moving panels of the mold and this attachment method determines the movement length or adjustment. The top attachment movement to the panel has a limited travel and the lateral attachment movement to the panel can have a larger travel and without limit, depending on the length of the male component.

Based on the top attachment model with a limited travel, a traditional mold centering system has a cage that supports a set of rollers between the male and the female portions, so that a greater adjustment between both of them can be achieved due to the friction reduction, since there is not friction against the walls but against the rollers, which have a rotating motion but not a translation one. The roller cage has also a specific length, which conditions the adjustment length. It also should be noted that there is friction between the male element and the female element.

DESCRIPTION OF THE INVENTION

In order to achieve the objectives and to avoid the disadvantages referred to in the preceding paragraphs, the invention proposes a mold centering system, which essentially has several centering elements arranged on the sides of a mold, wherein each one of them comprises a male device screwed to a first portion of the mold and a female device screwed to a second portion of the mold, being both portions fastened to a fixed plate and to a moveable plate of an injection machine.

In addition, the male device is equipped with an elongated shaft, constituent of the male element itself that fits into a through hole of a female device during the mold closing.

It is characterised in that the through hole incorporates at least two parallel planes delimited by at least two groups of revolving bodies such as rollers, located into guiding housings, which have a closed contour, through which the rollers travel with an endless motion, in simultaneous combination with a rotating motion of said rollers, while the elongated shafts move inside the through holes, said shafts contacting tangentially against some of the aforementioned rollers.

The female devices are characterised in that they comprise a support incorporating a base and two frontal bodies, on which are coupled bowl-shaped concentric covers; defining, between these and said frontal bodies, the guiding housings with a closed contour through which the rollers run, in such a way that said rollers are in contact with the lateral faces of the frontal bodies as well as with the inner lateral faces of the concentric covers.

The enveloping lateral walls of the concentric covers are in turn characterised in that they have rectangular windows facing each other, through which a portion of the rollers emerge, in such a way that the elongated shafts of the male devices contact tangentially with the rollers that emerge through said rectangular windows.

The guiding housings comprise a plantar configuration shaped as a rectangular frame with truncated vertex, being said guiding housings delimited by several planes defining the enveloping lateral face of the frontal bodies and by other parallel planes defining the enveloping inner lateral face of the concentric covers.

Another characteristic of the invention is that the rollers comprise narrow ends that contact against some inner parallel bands, adjacent to the larger sides of said rectangular windows, whereas in correspondence with the shorter sides of said windows, narrowed sloping surfaces are defined, which smooth the recirculation of said rollers in their translation travel, in combination with a simultaneous spinning motion during the endless motion of said rollers.

Another characteristic of the invention is that the concentric covers are fastened to the respective frontal bodies by means of a number of screws combined with a number of positioning pins.

In another embodiment, the revolving bodies comprise spherical bodies located in correspondence with the guiding housings in combination with a number of pairs of raceways acting as curved section channels, located on the inner lateral faces of the concentric covers, channels that are facing the lateral faces of the frontal bodies of the supports, contacting the spherical bodies with said lateral faces and said raceways.

Below, and for better comprehension purposes of this specification and making integral part thereof, a number of figures are attached wherein, by way of illustration only and by no way of limitation, the object of the invention has been represented.

DESCRIPTION OF AN EXEMPLARY EMBODIMENT OF THE INVENTION

Figure 1:
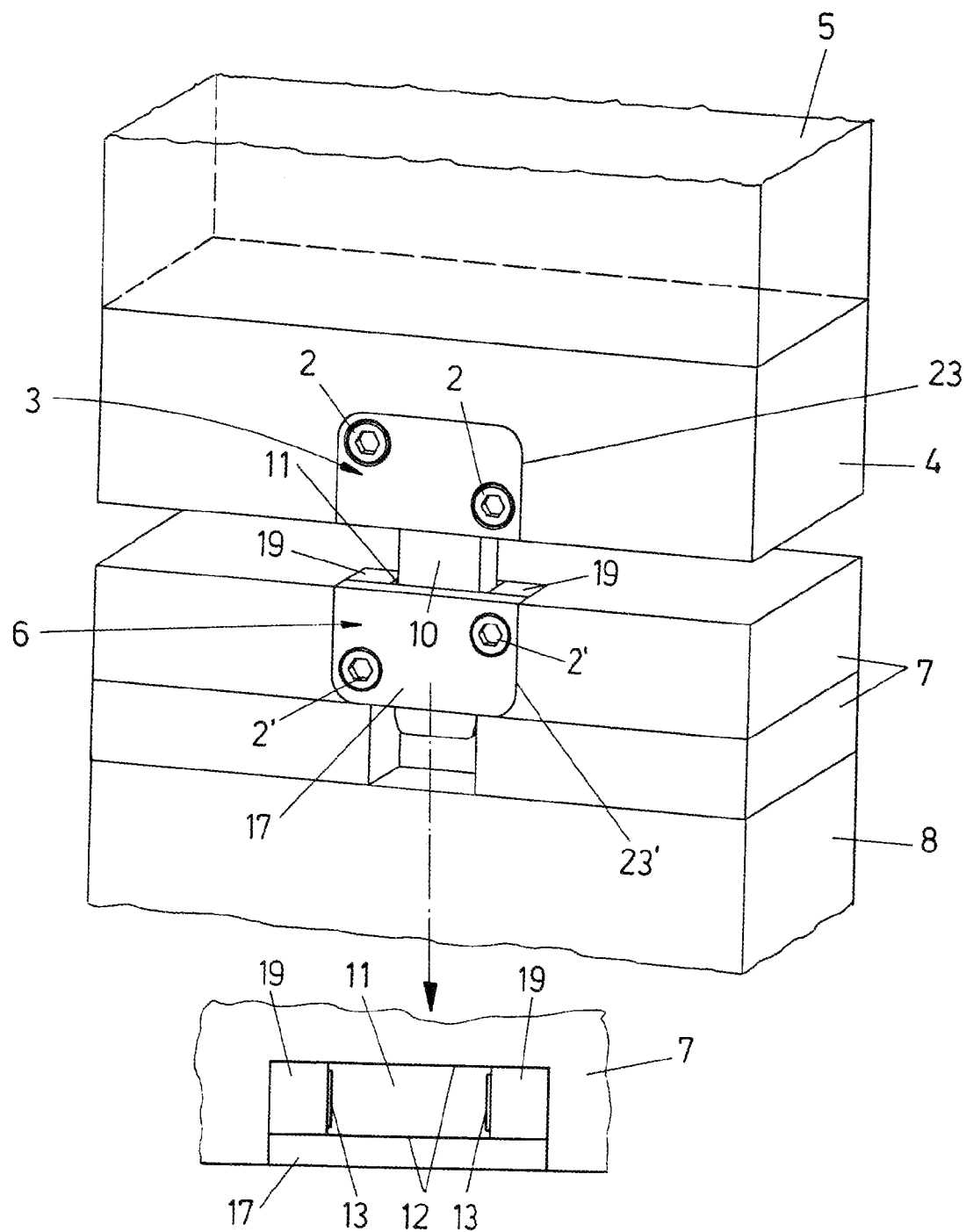
FIG. 1.—It shows a perspective view of the mold centering system, object of the invention. Basically, it comprises several centering elements, each one of which comprises in turn a male device and a female device, which are fastened to a first portion of the mold joined to a moveable plate of an injection machine and to a second portion of the mold joined to a fixed plate of said injection machine.
Figure 2:
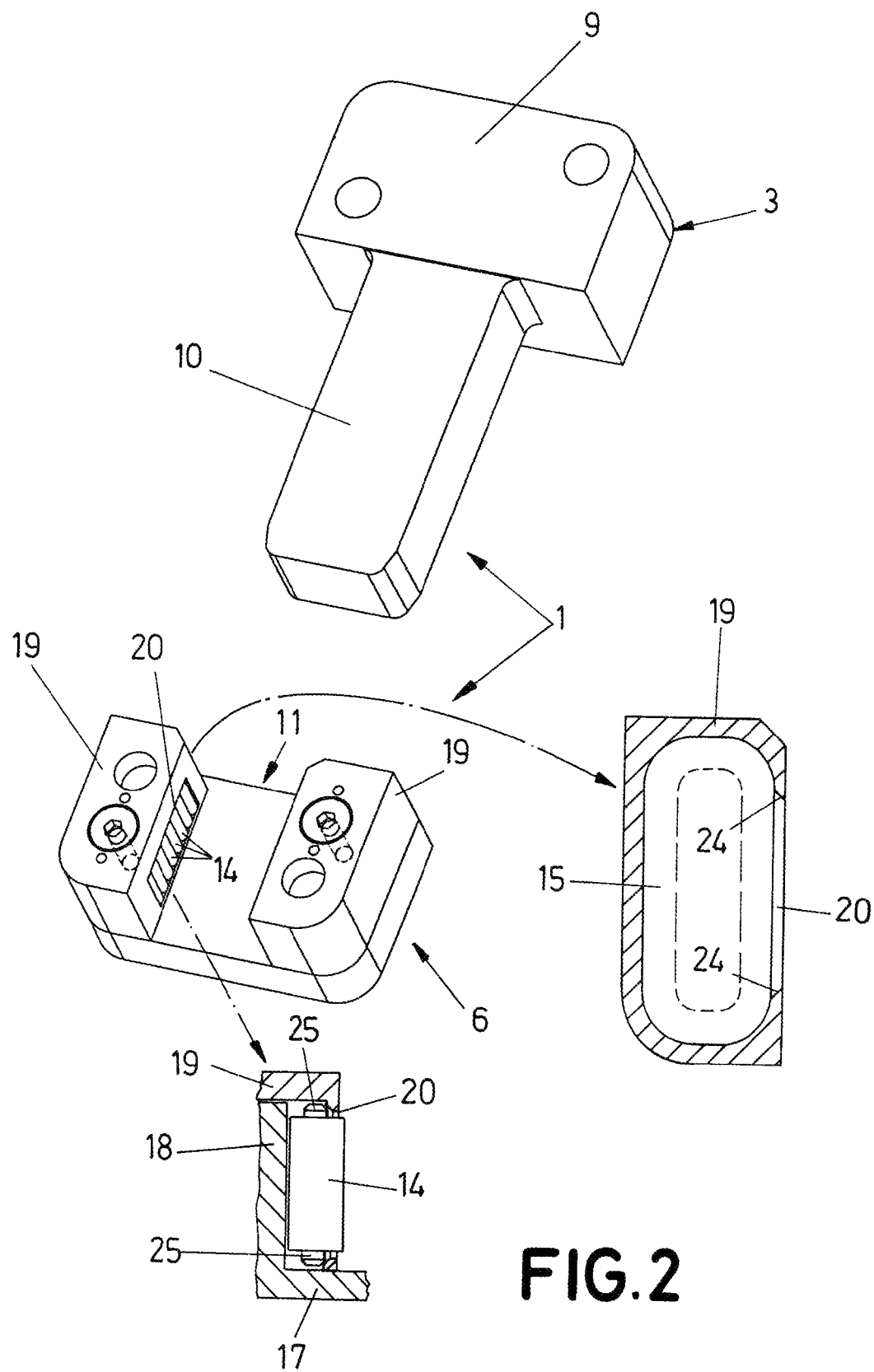
FIG. 2.—It shows an exploded view, in perspective, of the centering system.
Figure 3:
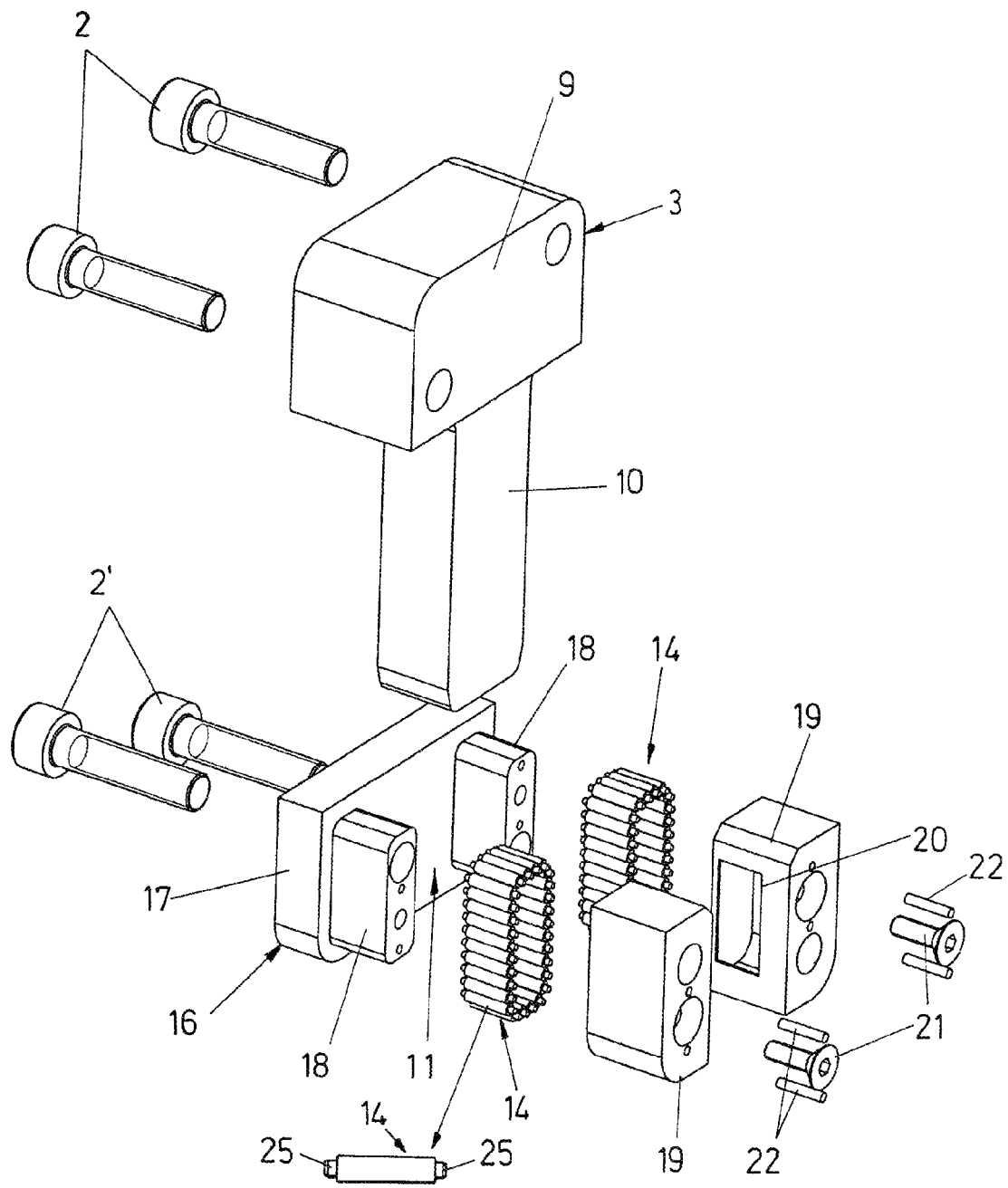
FIG. 3.—It shows an exploded view, in perspective, of the female device making part of the respective centering element.
Figure 4:
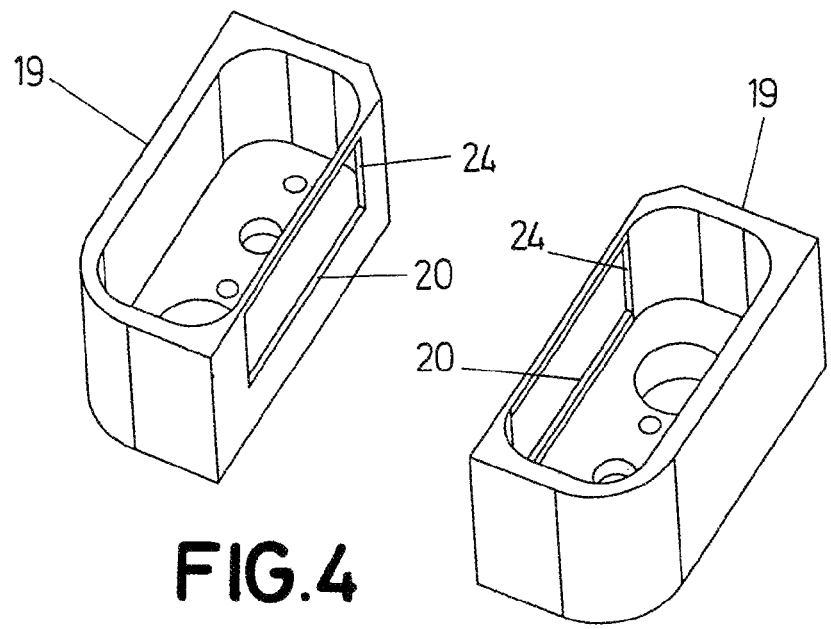
FIG. 4.—It shows a perspective view of a portion of the female device with another view, different from the one shown in the previous figure.
Figure 5:
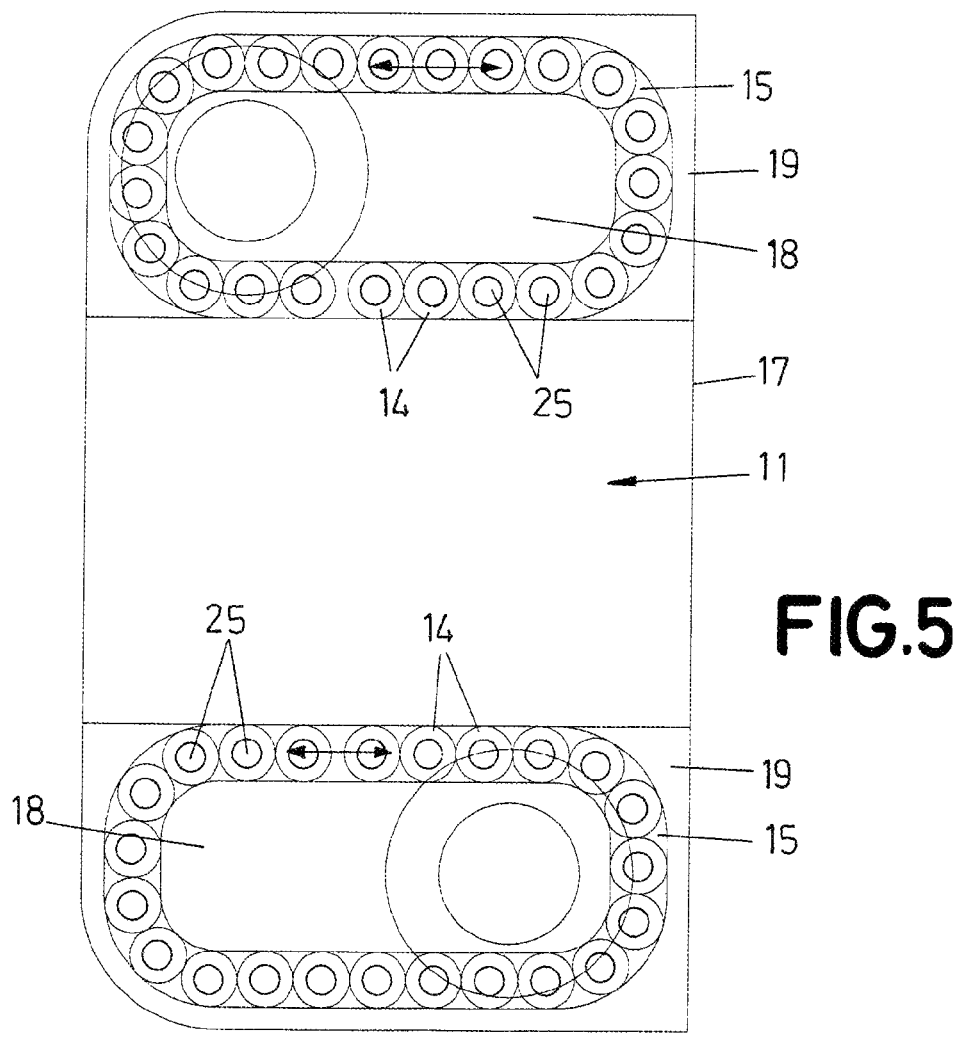
FIG. 5.—It shows a side view of the female device wherein the guiding of two groups of revolving bodies determined by a number of rollers with an endless travel and coupled into guiding housings with a closed contour, according to a first embodiment, are highlighted.
Figure 6:
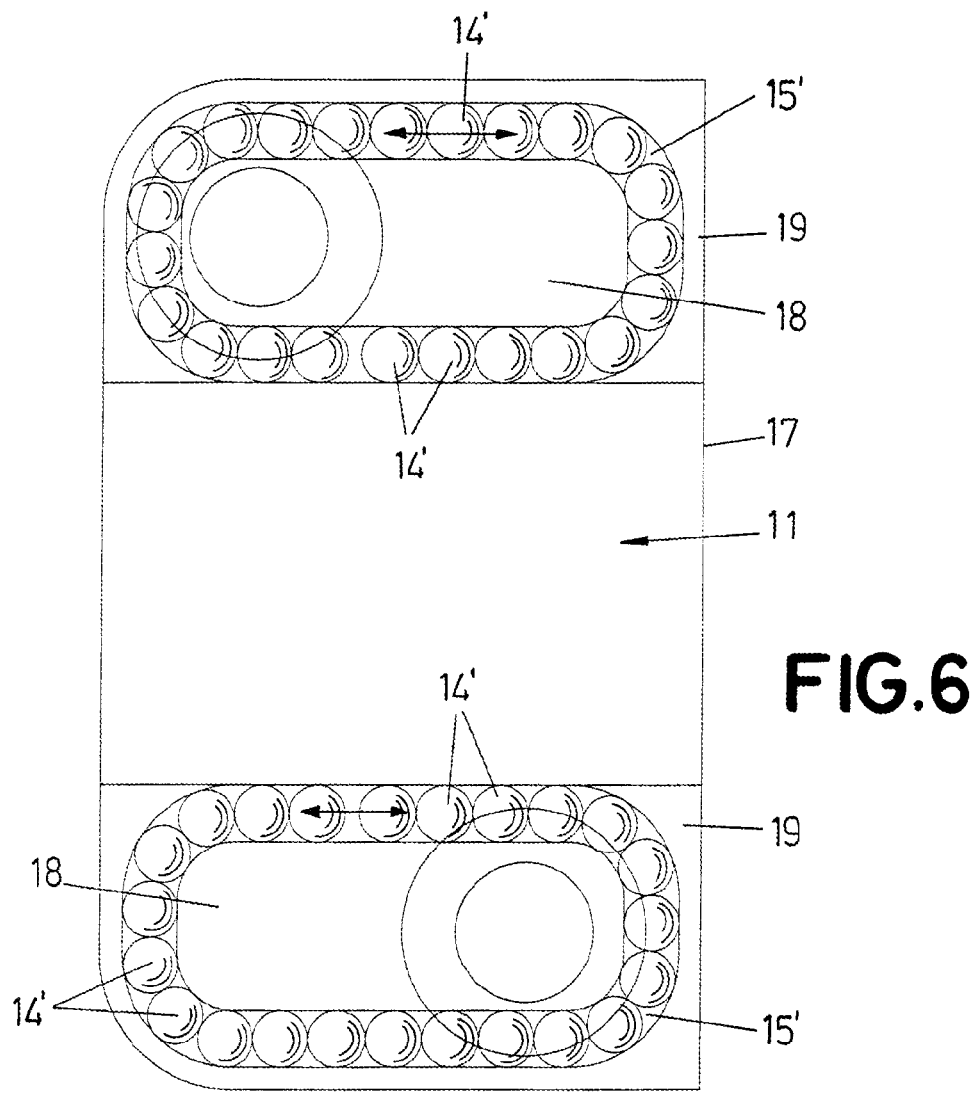
FIG. 6.—It shows a similar view to the preceding one, wherein the female device is provided with revolving bodies determined by spherical bodies.
Figure 7:
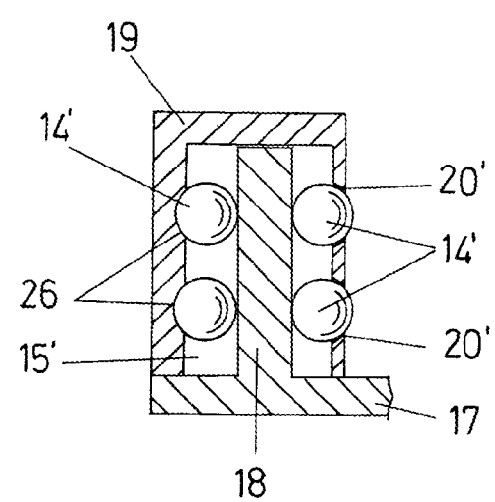
FIG. 7.—It shows a sectional view of the female device that is provided with spherical bodies.

Taking into account the numerals adopted in the figures, the following numbering have been provided with regard to the mold centering system, for its use in the description:

1.—Pair of centering elements
2.—First screws
2'.—Second screws
3.—Male device
4.—First portion of the mold
5.—Moveable plate
6.—Female device
7.—Second portion of the mold
8.—Fixed plate
9.—Head
10.—Elongated shaft
11.—Through hole
12.—First areas facing each other
13.—Second areas facing each other
14.—Rollers
14'.—Spherical bodies
15.—Roller guiding housings
15'.—Spherical bodies guiding housings
16.—Support
17.—Base
18.—Frontal bodies
19.—Concentric covers
20.—Rectangular windows
20'.—Rectangular windows
21.—Screws
22.—Positioning pin
23.—First lateral mortising
23'.—Second lateral mortising
24.—Narrowed sloping surfaces
25.—Narrow ends
26.—Pairs of raceways It comprises a number of pairs of centering elements 1 arranged on the sides of a mold, in such a way that each centering element 1 comprises in turn; a male device 3 screwed to a first portion 4 of the mold fastened to a moveable plate 5 of a injection machine; and a second female device 6 screwed to a second portion 7 of the mold fastened to a fixed plate 8 of said machine; so when the mold is closed by the frontal motion of the moveable plate 5, which comes closer to the fixed plate 8, during the last run of the moveable plate 5 travel, the male device 3 is engaged and guided into the female device 6.

The male device 3 comprises a head 9, through which it is joined to the first portion of the mold 4 with the help of a number of first screws 2, said male device 3 further comprising an elongated shaft 10, constituent of the male element itself, which is fitted and slid into a through hole 11 of the female device 6, during the closing and opening of the mold. The through hole 11 is delimited between two first areas facing each other 12 and two second areas facing each other 13, which are parallel and delimited by the tangency of a series of revolving bodies, such as rollers 14 (first embodiment) grouped into two guiding housings 15 with a closed contour, which allow the rollers 14 to move with an endless motion travel, by a combination of translation and spinning motions.

The entry and exit of the elongated shaft 10 of the male device 3 inside and out of the respective through hole 11 drags the rollers 14 along their respective guiding housings 15, simultaneously causing as well a spinning motion of the rollers, thus reducing substantially the friction and preventing seizure problems, and facilitating at the same time the adjustment movements.

The female devices 6 comprise a support 16 that incorporates a base 17 and two frontal bodies 18, on which a number of bowl-shaped concentric covers 19 are coupled, defining between them and said frontal bodies the guiding housings 15 with a closed contour, through which the rollers 14 run, in such a way that they contact with the lateral faces of the frontal bodies 18 and with the lateral inner faces of the concentric covers 19, as well.

The enveloping lateral walls of the concentric covers 19 have rectangular windows 20 facing each other, through which emerges a portion of the rollers 14, in such a way that the elongated shafts 10 of the male devices 3 contact tangentially with the rollers 14 that emerge through the rectangular windows 20.

The concentric covers 19 are fastened to the respective frontal bodies 18 by means of screws 21 combined with positioning pins 22.

In turn, the arrangement of each female device 6 is joined to the second portion 7 of the mold by means of second elongated screws 2'.

The guiding housings 15 comprise a plantar configuration in the shape of rectangular frame with truncated vertex, being said guiding housings 15 delimited by several planes defining the enveloping lateral face of the frontal bodies 18 and by other parallel planes defining the enveloping inner lateral face of the concentric covers 19.

On the other hand, so the rollers 14 can emerge outwardly regarding the rectangular windows 20 that face each other, so they can comply properly with their purpose, said rollers 14 comprise narrow ends 25, which contact against inner parallel bands, adjacent to the larger sides of said rectangular windows 20, whereas the shorter sides of said windows 20 are equipped with narrowed sloping surfaces 24 that smooth the recirculation of said rollers 14 in their endless translation travel combined with the spinning motion.

The head 9 of the male device 3 is fitted in a first lateral mortising 23 of the first portion 4 of the mold, whereas the female device 6 fits into a second lateral mortising 23' of the second portion 7 of said mold.

In a second embodiment, revolving bodies are provided, which are determined by spherical bodies 14', located in correspondence with guiding housings 15', in combination with a number of pairs of raceways 26 acting as curved-section channels, located on the inner lateral faces of the concentric covers 19. Said channels face the lateral faces of the frontal bodies 18 of the supports 16 and the spherical bodies 14', contact with said lateral faces and the raceways 26.

In this second embodiment, the concentric covers 19 have other rectangular windows 20' facing each other, through which emerges a portion of said spherical bodies 14'.

The invention claimed is:

1. A mold centering system, which has several centering (1) elements arranged on the sides of a mold, each one of them comprising a male device (3) screwed to a first portion (4) of the mold and a female device (6) screwed to a second portion (7) of the mold, the first and second portions (4, 7) being fastened to a fixed plate (8) and to a moveable plate (5) of an injection machine, wherein the male device (3) includes an elongated shaft (10), which fits in a through hole (11) of the female device (6) during closing of the mold; wherein the through hole (11) incorporates at least two parallel planes, delimited by at least two groups of revolving bodies located in guiding housings, which have a closed contour, and through which the revolving bodies run with an endless motion simultaneously combined with a spinning motion of said revolving bodies during the movement of the elongated shaft (10) inside the through hole (11), said shaft (10) contacting tangentially against some of said revolving bodies; wherein the female device (6) comprises a support (16), which incorporates a base (17) and two frontal bodies (18) on which bowl-shaped concentric covers (19) are coupled, the guiding housings being defined, between the concentric covers and said frontal bodies (18), with a closed contour through which run the revolving bodies, said revolving bodies contacting lateral faces of the frontal bodies (18) as well as inner lateral faces of the concentric covers (19); wherein enveloping lateral walls of the concentric covers (19) have rectangular windows (20) facing each other, through which some of the revolving bodies emerge, the elongated shaft (10) of the male device (3) tangentially contacting with the emerging revolving bodies.

2. A mold centering system, according to claim 1 wherein the revolving bodies are rollers (14), and the rollers (14) comprise narrow ends (25), which contact against inner parallel bands, adjacent to larger sides of said rectangular windows (20), whereas shorter sides of said windows (20) are equipped with narrowed sloping surfaces (24), which smooth the recirculation of said rollers in their endless translation travel combined with the spinning motion of said rollers (14).

3. A mold centering system, according to claim 2 wherein the guiding housings (15-15') comprise a rectangular-shaped plantar configuration with truncated vertex, being said guiding housings (15-15') delimited by a plurality of planes defining enveloping lateral faces of the frontal bodies (18) and by other parallel planes defining enveloping inner lateral faces of the concentric covers (19).

4. A mold centering system, according to claim 3, wherein the concentric covers (19) are fastened to the respective frontal bodies (18) by screws (21) in combination with positioning pins (22).

5. A mold centering system, according to claim 2, wherein the concentric covers (19) are fastened to the respective frontal bodies (18) by screws (21) in combination with positioning pins (22).

6. A mold centering system, according to claim 1 wherein the revolving bodies are spherical bodies (14') and the guiding housings (15') of the spherical bodies (14') are complemented with pairs of raceways (26) acting as curved section channels facing each other, located on the inner lateral faces (19) of the concentric covers, the spherical bodies (14') contacting said inner lateral faces and said raceways (26).

7. A mold centering system, according to claim 6, wherein the guiding housings (15-15') each comprise a rectangular-shaped plantar configuration with truncated vertex, being said guiding housings (15-15') delimited by a plurality of planes defining enveloping lateral faces of the frontal bodies (18) and by other parallel planes defining enveloping inner lateral faces of the concentric covers (19).

8. A mold centering system, according to claim 6, wherein the concentric covers (19) are fastened to the respective frontal bodies (18) by screws (21) in combination with positioning pins (22).

9. A mold centering system, according to claim 1 wherein the concentric covers (19) are fastened to the respective frontal bodies (18) by screws (21) in combination with positioning pins (22).

10. A mold centering system, according to claim 1, wherein the revolving bodies are rollers (14).

11. A mold centering system, according to claim 10, wherein the concentric covers (19) are fastened to the respective frontal bodies (18) by screws (21) in combination with positioning pins (22).

12. A mold centering system, according to claim 1, wherein the revolving bodies are spherical bodies (14').

13. A mold centering system, according to claim 12, wherein the concentric covers (19) are fastened to the respective frontal bodies (18) by screws (21) in combination with positioning pins (22).

* * * * *